United States Patent
Roger

(10) Patent No.: US 7,297,189 B2
(45) Date of Patent: Nov. 20, 2007

(54) JR DUST CLEAN VACUUM

(75) Inventor: Jessey Roger, P.O. Box #361, Secane, PA (US) 19018-0361

(73) Assignee: Jessey Roger, Secane, PA (US)

( * ) Notice: Subject to any disclaimer, the term of this patent is extended or adjusted under 35 U.S.C. 154(b) by 282 days.

(21) Appl. No.: 10/948,331

(22) Filed: Sep. 24, 2004

(65) Prior Publication Data

US 2006/0065124 A1 Mar. 30, 2006

(51) Int. Cl.
*B01D 47/02* (2006.01)
(52) U.S. Cl. .................. 96/351; 96/371; 55/DIG. 5; 15/353
(58) Field of Classification Search ........... 96/329, 96/351, 355, 361, 371; 55/318, DIG. 2, 55/DIG. 3; 15/347, 353
See application file for complete search history.

(56) References Cited

U.S. PATENT DOCUMENTS

| | | | | |
|---|---|---|---|---|
| 2,514,809 A | * | 7/1950 | Soergel | 55/319 |
| 2,972,769 A | * | 2/1961 | Keating et al. | 15/321 |
| 3,431,582 A | * | 3/1969 | Grave | 15/321 |
| 4,466,155 A | * | 8/1984 | Grave | 15/321 |
| 4,726,825 A | * | 2/1988 | Natale | 55/318 |
| 4,784,676 A | * | 11/1988 | Hale | 96/342 |
| 5,078,759 A | * | 1/1992 | Kira | 95/223 |
| 5,242,588 A | * | 9/1993 | Reese | 210/232 |
| 5,354,347 A | * | 10/1994 | McCoy et al. | 96/330 |
| 5,776,215 A | * | 7/1998 | Amoretti | 96/247 |
| 5,873,930 A | * | 2/1999 | Sanchez | 96/278 |
| 5,908,491 A | * | 6/1999 | Hobbs | 95/202 |

* cited by examiner

*Primary Examiner*—Frank M. Lawrence
(74) *Attorney, Agent, or Firm*—Edward F. Behm, Jr.

(57) ABSTRACT

The present invention consists of a system related to vacuum cleaners, more specifically, to a system designed to filter the micro-dust that escapes from the bag with the air. The inlet turbine will suck the dirt into the vacuum cleaner bag Zone 1 where the air will escape into Zone 2. At the same time, the micro-dust will also escape with the air into Zone 2. The exhaust turbine sucks the dust content air in Zone 2; hence, the dust content air will travel through the dust collector pipes then through the dust collector main pipe, then through the small "L" type pipes, then hit the water dumping the dust into the water in the compartment one. The dust content air then travels up to get into the small "L" type pipes in the compartment two, then hits the water.

2 Claims, 7 Drawing Sheets

JR DUST CLEAN VACUUM

CROSS REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The invention relates to vacuum cleaners. JR Dust Clean Vacuum Cleaners R1 and R2 are designed to filter the micro particles that normally escape with the exhaust air in a vacuum cleaner. R1 Model is called the Dry JR Dust Clean Vacuum Cleaner, and the R2 Model is called the Wet JR Dust Clean Vacuum Cleaner. But the principles that are practiced in both of them are the same.

2. Description of the Background

The present invention relates to vacuum cleaners. There are a number of models in the market. JR Dust Clean Vacuum Cleaner is designed to have two zone systems called Zone 1, the dirt zone, and Zone 2, the dust zone. JR Dust Clean Vacuum Cleaners come with inlet turbine to suck the dirt into the vacuum cleaner bag and exhauster turbine to suck the micro-dust content air from Zone 2 through the dust collector pipe, then through the dust collector zone, then and to exhaust the clean air from the vacuum cleaner.

BRIEF SUMMARY OF THE INVENTION

JR Dust Clean Vacuum Cleaner R1, R2 Models are designed to filter all the micro-dust from the air that escapes from the bag which is situated in Zone 1, before the air is exhausted out of the vacuum cleaner.

With the JR Dust Clean Vacuum Cleaner Models R1 and R2, the engineering practices are the same, but Model R2 comes with a dust collector tank to improve the dust purification efficiently. A normal wet JR Dust Clean Vacuum Cleaner comes with one dust collector tank, but the Model R2 comes with a four compartment dust collector tank which purifies the air four times by removing the dust from the air. JR Dust Clean Vacuum Cleaners have two turbines: one is the inlet turbine, the other is an exhaust turbine. Once the JR Vacuum Cleaner is switched on, both fans will kick in simultaneously and when shut off, the inlet will shut off first, and the exhaust will shut off a few minutes later.

The dry JR Dust Clean Vacuum Cleaner Model R1 does not come with a dust collector tank. Instead of the tank, it is equipped with a moisturized filter that will collect the dust before it is exhausted.

Another advantage of the JR Dust Clean Vacuum Cleaner Model R1 is that once the vacuum is done, the filter can be removed and washed for reuse. With Model R2, the water that collected the dust can be flushed out by forcing water through the dust water inlet pipe after opening the dust water outlet tap.

Another advantage is a level control float device is equipped between the reservoir and the collector tank. This will maintain a constant distance between the outlet small "L" type pipe and top of the water level to create a better dust collection.

BRIEF DESCRIPTION OF THE SEVERAL VIEWS OF THE DRAWING

A more complete understanding of the present invention may be derived from referring to the detailed description and claims when considered in connection with the figures where reference letters and numbers are similar items throughout the figures.

Below are the part names of both JR Dust Clean Vacuum Cleaners:

| | | | |
|---|---|---|---|
| (1) | Inlet turbine | (1A) | Dust water outlet tap |
| (2) | Inlet pipe | (2A) | Dust water outlet pipe |
| (3) | Vacuum bag | (3A) | Dust collector tank |
| (4) | Vacuum bag net cage | (4A) | Reservoir fill pipe |
| (5) | Zone one | (5A) | Dust water inlet pipe |
| (6) | Zone two | (6A) | Water that collects dust |
| (7) | Zone two casing | (7A) | Small "L" type pipe that helps to hit the dusty air to the water so that the dust will get immersed into the water. |
| (8) | Dust collector pipes | | |
| (9) | Dust collector main pipe | | |
| (10) | Moisturize dust filter | | |
| (11) | Filter casing | | |
| (12) | Exhaust pipe | | |
| (13) | Exhaust turbine | | |

Figure 1:
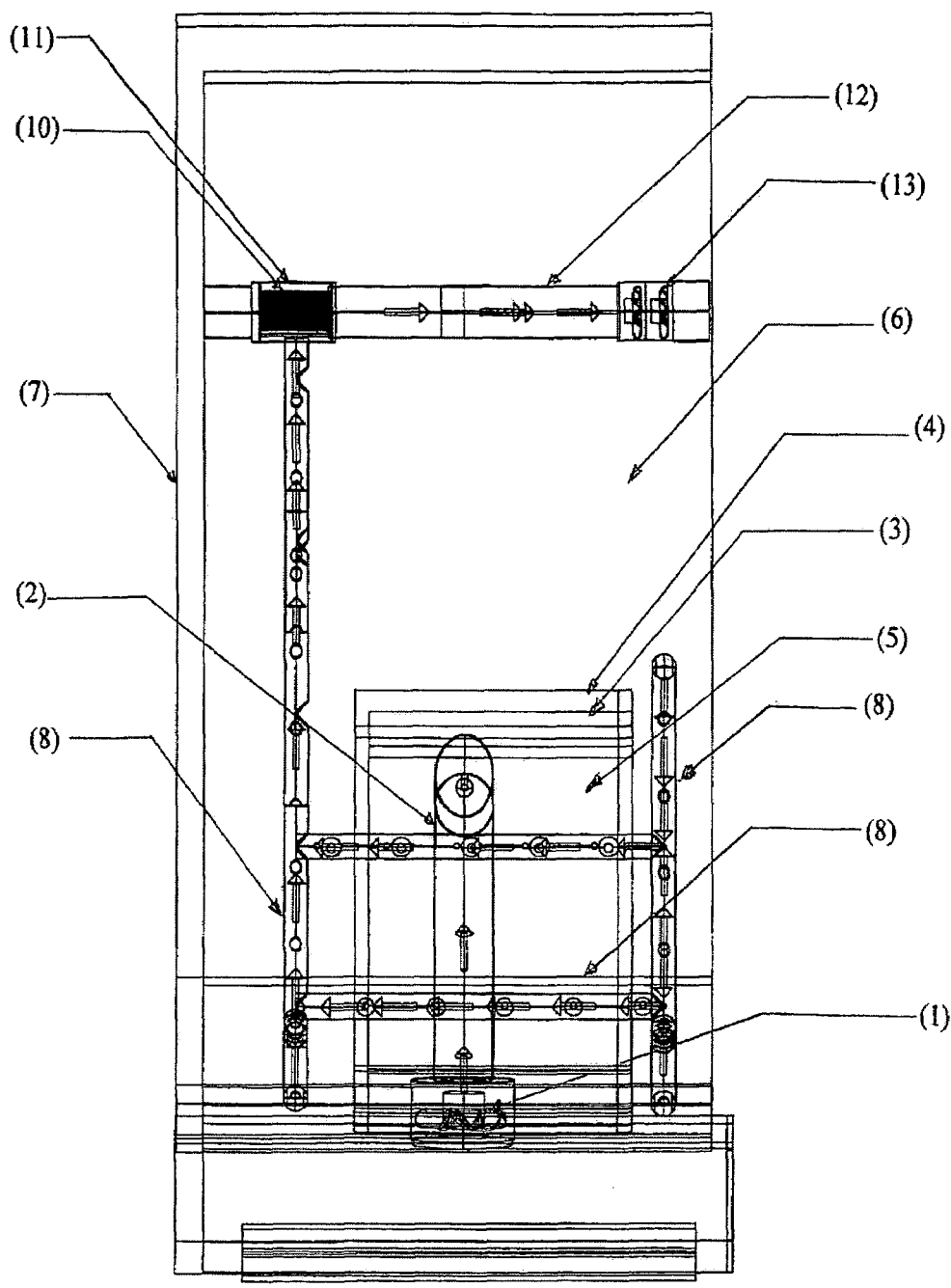

FIG. 1 The front views of the dry JR Dust Clean Vacuum Cleaner Model R1.

Figure 2:
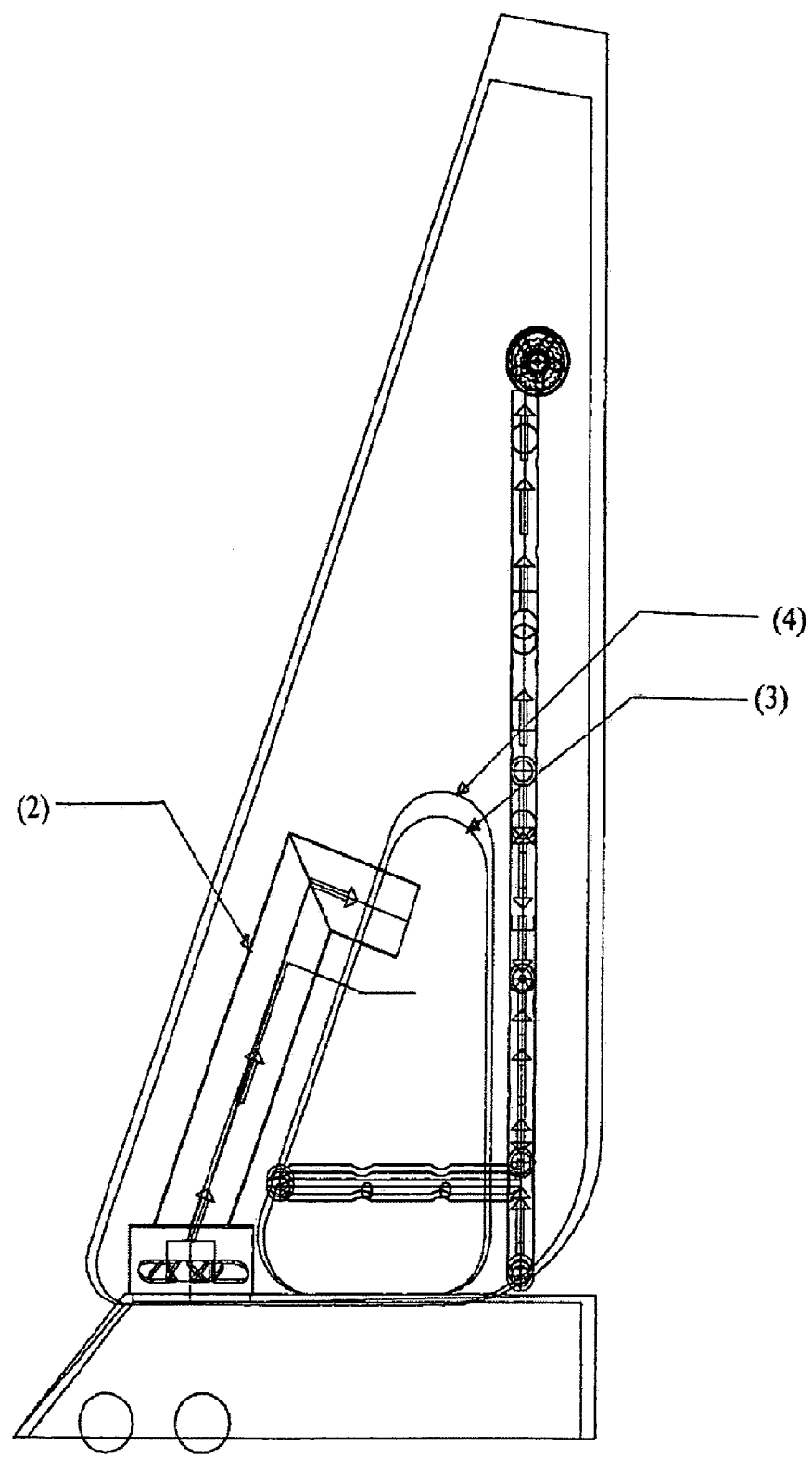

FIG. 2 Right view of the dry JR Dust Clean Vacuum Cleaner Model R1.

Figure 3:
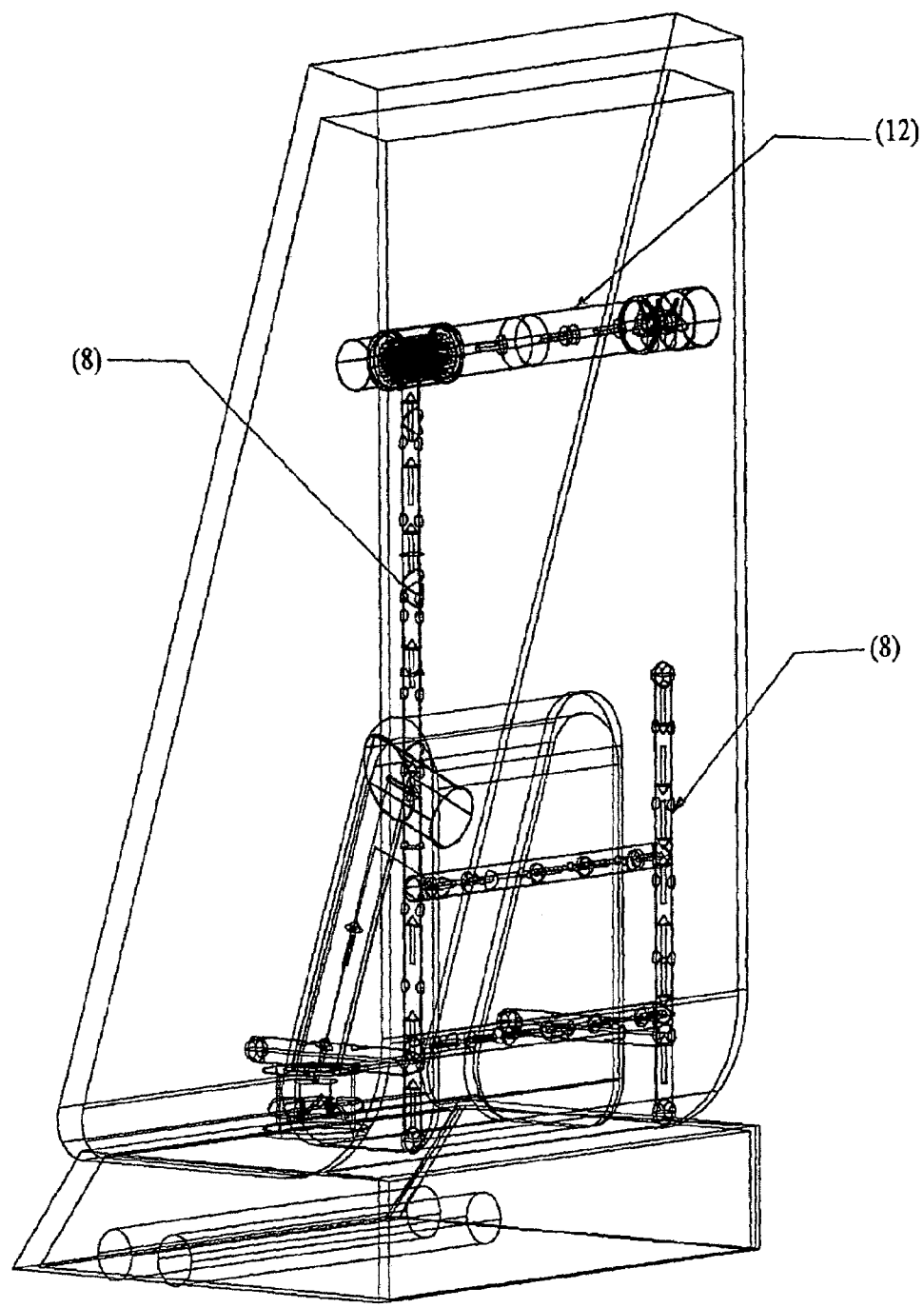

FIG. 3 Southwest view of the dry JR Dust Clean Vacuum Cleaner Model R1 shows a 3D line drawing version of it, to show how the parts are situated.

Figure 4:
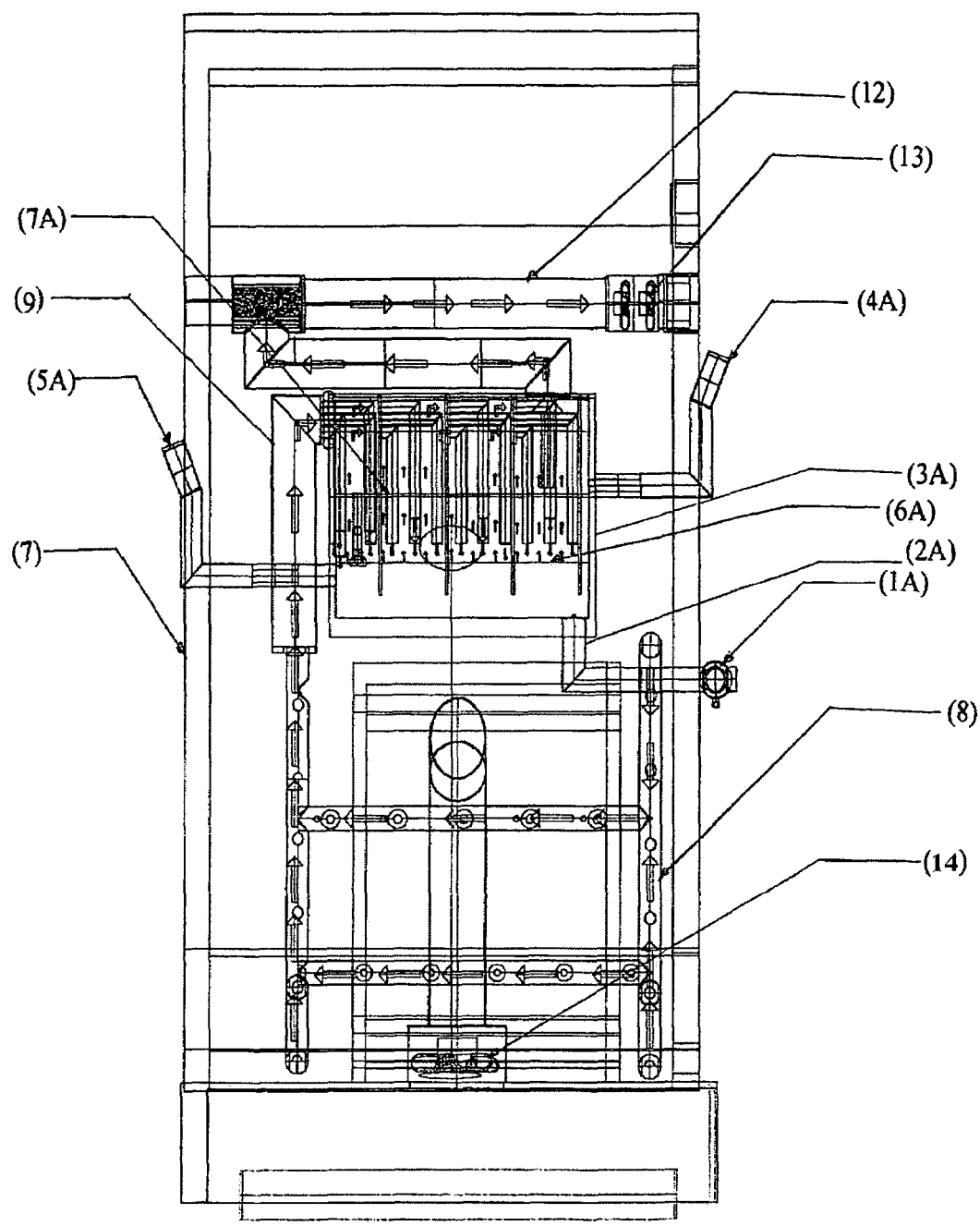

FIG. 4 Front view of the wet JR Dust Clean Vacuum Cleaner Model R2.

Figure 5:
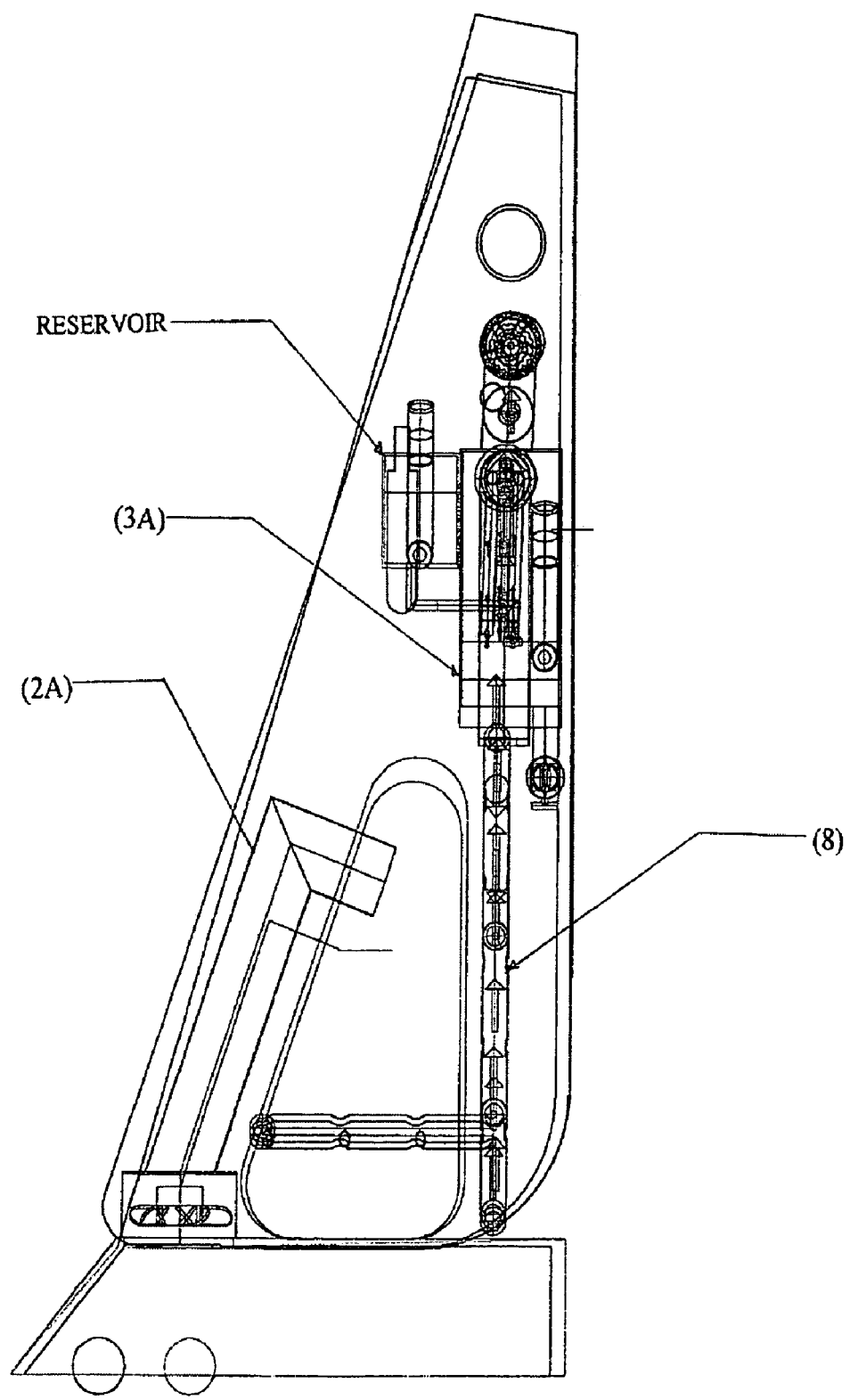

FIG. 5 Right view of the wet JR Dust Clean Vacuum Cleaner Model R2.

Figure 6:
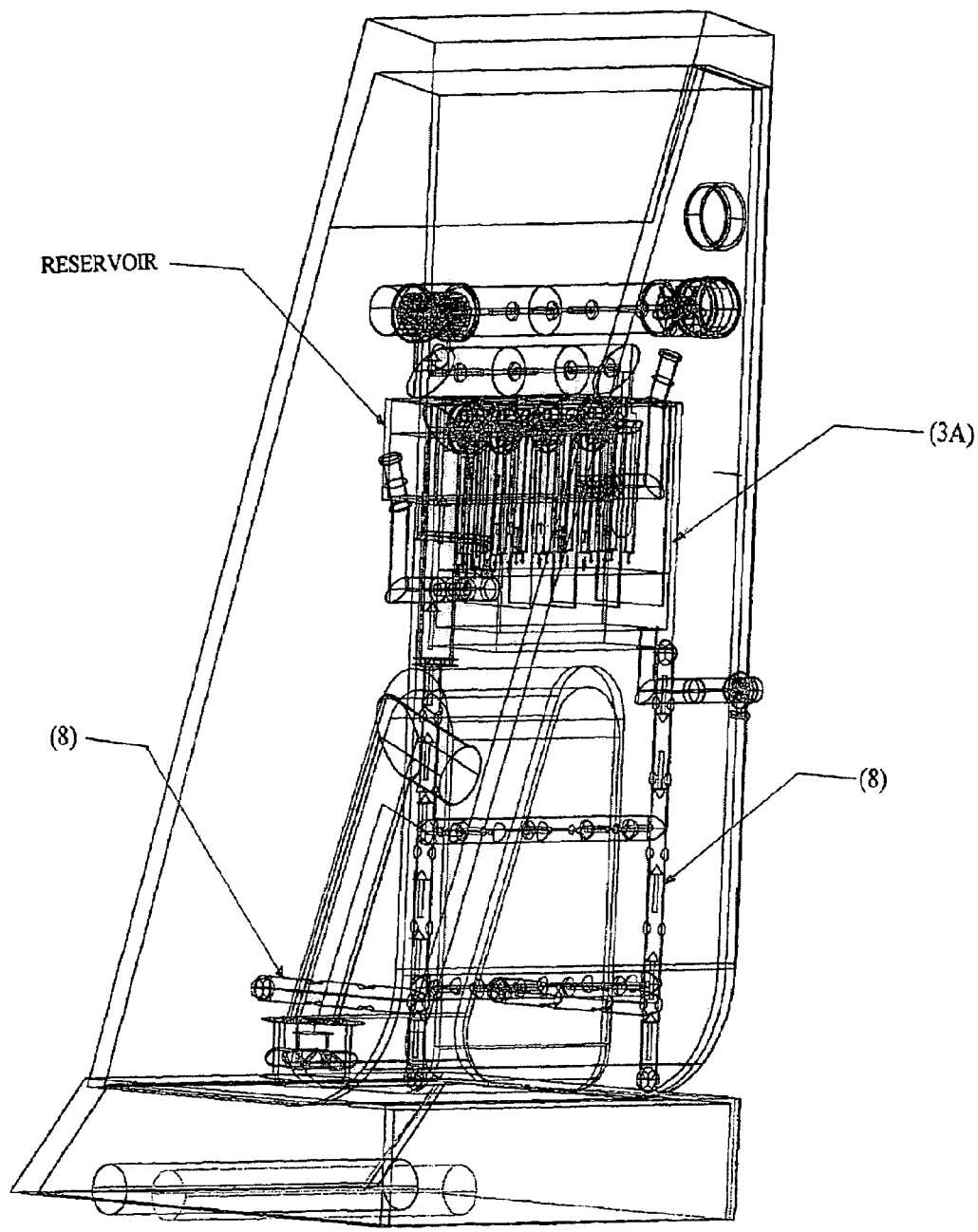

FIG. 6 Southwest view of the wet JR Dust Clean Vacuum Cleaner Model R2 shows a 3D line drawing version to show how the parts are situated.

Figure 7:
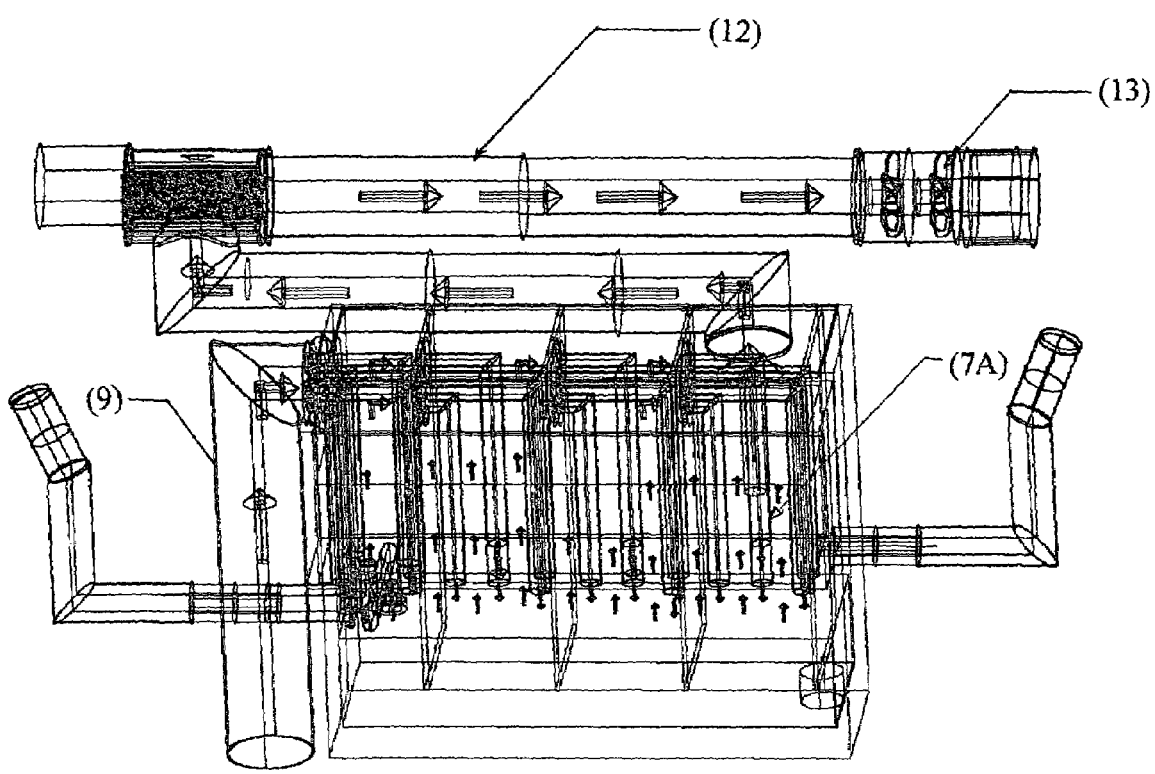

FIG. 7 Southwest view of the dust collector tank from the wet JR Dust Clean Vacuum Cleaner Model R2 shows a 3D line drawing version to show the four-compartment dust collector and how the air travels from the main collector pipe to the small "L" type pipe in compartment one, hit the water, dump the dust, then the air will travel up and get into the second set of small "L" pipes in compartment two, hit the water and dump the dust if any is left in the air. Hence, it keeps repeating and depends on the amount of compartments. Most of the vacuum cleaners would be able to purify with two compartments.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, many other elements found in typical vacuum. Those of ordinary skill in the art will recognize that other elements are desirable and/or required in order to implement the present invention. However, because such elements are well known in the art, and because they do not facilitate a better understanding of the present invention, a discussion of such elements is not provided herein.

JR Dust Clean Vacuum Cleaner R1, R2 Models are designed to filter all the micro-dust from the air that escapes from the bag which is situated in Zone 1, before the air is exhausted out of the vacuum cleaner.

With the JR Dust Clean Vacuum Cleaner Models R1 and R2, the engineering practices are the same, but Model R2 comes with a dust collector tank to improve the dust purification efficiently. A normal wet JR Dust Clean Vacuum Cleaner comes with one dust collector tank, but the Model R2 comes with a four compartment dust collector tank which purifies the air four times by removing the dust from the air. JR Dust Clean Vacuum Cleaners have two turbines: one is the inlet turbine, the other is an exhaust turbine. Once the JR Vacuum Cleaner is switched on, both fans will kick in simultaneously and when shut off, the inlet will shut off first, and the exhaust will shut off a few minutes later.

The dry JR Dust Clean Vacuum Cleaner Model R1 does not come with a dust collector tank. Instead of the tank, it is equipped with a moisturized filter that will collect the dust before it is exhausted.

Another advantage of the JR Dust Clean Vacuum Cleaner Model R1 is that once the vacuum is done, the filter can be removed and washed for reuse. With Model R2, the water that collected the dust can be flushed out by forcing water through the dust water inlet pipe after opening the dust water outlet tap.

Another advantage is a level control float device is equipped between the reservoir and the collector tank. This will maintain a constant distance between the outlet small "L" type pipe and top of the water level to create a better dust collection.

The disclosure herein is directed to the variations and modifications of the elements and methods of the invention disclosed that will be apparent to those skilled in the art in light of the disclosure herein. Thus, it is intended that the present invention covers the modifications and variations of this invention, provided those modifications and variations come within the scope of the appended claims and the equivalents thereof.

I claim:

1. A dust collection apparatus, comprising:
   a mobile housing containing at least a first collection zone and a second collection zone;
   an inlet turbine operatively connected to an inlet pipe wherein said inlet pipe terminates within said first collection zone;
   at least one dust collector pipe, wherein the at least one dust collector pipe is operatively connected to the first collection zone and the second collection zone;
   an exhaust pipe operatively connected to the second collection zone;
   a water reservoir operatively connected to the second zone; and
   a level control float device operatively disposed between the reservoir and the second collection zone, wherein the control float device controls a volume of the water in the second collection zone.

2. The apparatus of claim 1, wherein the second collection zone further comprises a moisture dust filter.

* * * * *